US005834638A

United States Patent [19]

Taylor et al.

[11] Patent Number: 5,834,638

[45] **Date of Patent: *Nov. 10, 1998**

[54] FUEL SENSOR

[75] Inventors: James Douglas Taylor, Chesterfield, Mo.; Jeffrey Paul Mara, Livonia, Mich.; Dale Michael Gilman, Clawson, Mich.; John Alfred Kundrot, Westland, Mich.; William Thomas Moore, Ypsilanti, Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 610,505

[22] Filed: Mar. 4, 1996

[51] Int. Cl.[6] .............................. G01L 9/12; G01M 15/00

[52] U.S. Cl. .............................. 73/119 A; 73/115; 73/714; 73/756

[58] Field of Search ............................ 73/115, 116, 117.2, 73/117.3, 118.1, 119 A, 714, 756

[56] References Cited

U.S. PATENT DOCUMENTS

| | | | |
|---|---|---|---|
| 3,783,844 | 1/1974 | Gural | 123/52 M |
| 4,125,093 | 11/1978 | Platzer, Jr. | 123/32 EA |
| 4,463,729 | 8/1984 | Bullis et al. | 73/117.3 |
| 4,474,159 | 10/1984 | Katnik | 123/468 |
| 4,519,368 | 5/1985 | Hudson, Jr. | 123/468 |
| 4,570,600 | 2/1986 | Atkins et al. | 123/468 |
| 4,601,275 | 7/1986 | Weinand | 123/468 |
| 4,899,712 | 2/1990 | De Bruyn et al. | 123/468 |
| 4,922,880 | 5/1990 | Seibt et al. | 123/509 |
| 4,922,956 | 5/1990 | Lemp | 123/456 |
| 5,022,372 | 6/1991 | Imura et al. | 123/456 |
| 5,092,300 | 3/1992 | Imoehl et al. | 123/469 |
| 5,111,699 | 5/1992 | Walstra et al. | 73/119 A |
| 5,168,856 | 12/1992 | Lorraine | 123/468 |
| 5,168,857 | 12/1992 | Hickey | 123/468 |
| 5,197,435 | 3/1993 | Mazur et al. | 123/456 |
| 5,233,963 | 8/1993 | Gregorius et al. | 123/456 |
| 5,351,548 | 10/1994 | Briggs et al. | 73/119 A |
| 5,357,792 | 10/1994 | Getenby | 73/119 A |
| 5,410,916 | 5/1995 | Cook | 73/756 |
| 5,528,941 | 6/1996 | Ogawa | 73/756 |

*Primary Examiner*—George M. Dombroske
*Attorney, Agent, or Firm*—Mark S. Sparschu

[57] ABSTRACT

In one embodiment of the present invention, a fuel sensor for a motor vehicle includes a pressure transducer integrated into an end cap for a fuel rail of the vehicle's engine. Further, a temperature transducer can also be included. Fuel sensors according to the present invention facilitate improvements in vehicle packaging and cost.

13 Claims, 5 Drawing Sheets

FIG. 6.
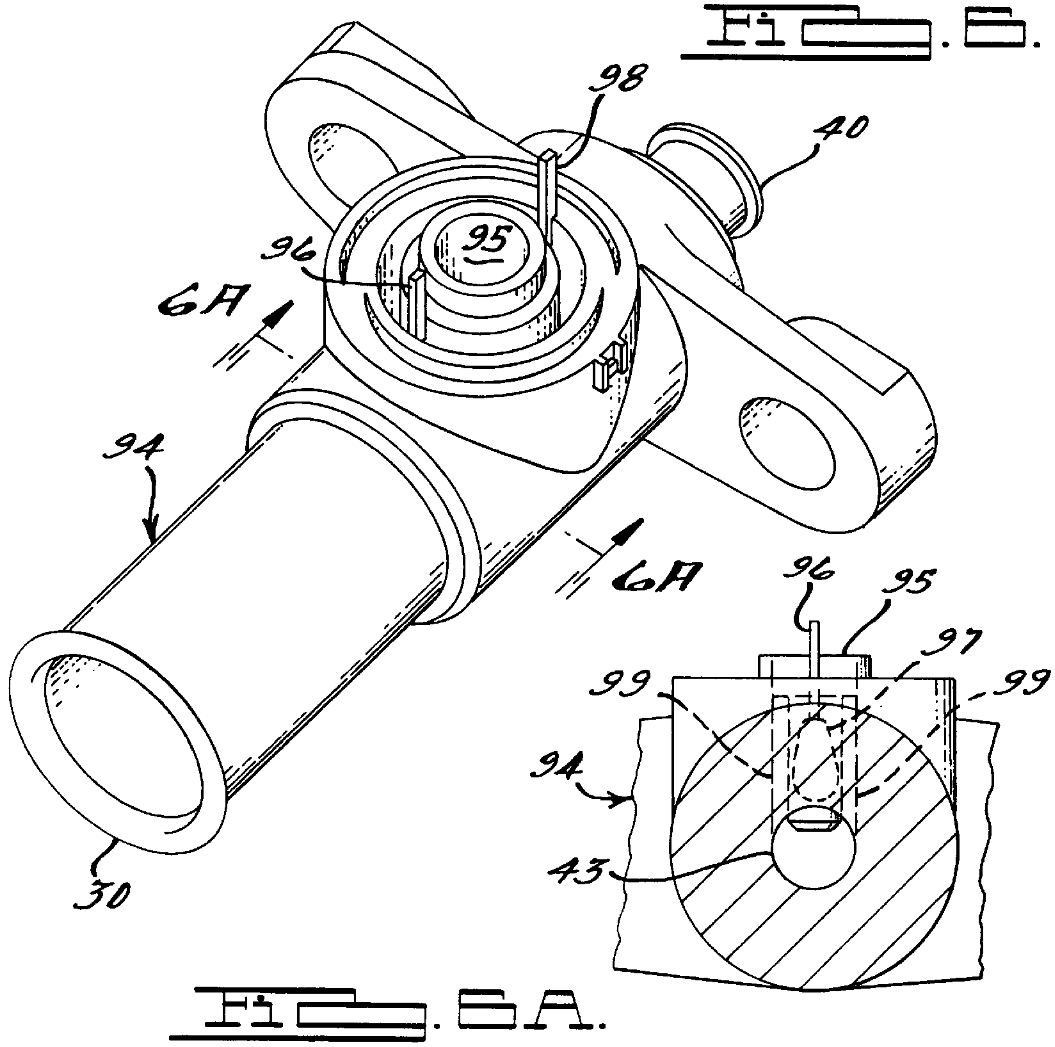
FIG. 6A.
FIG. 7.
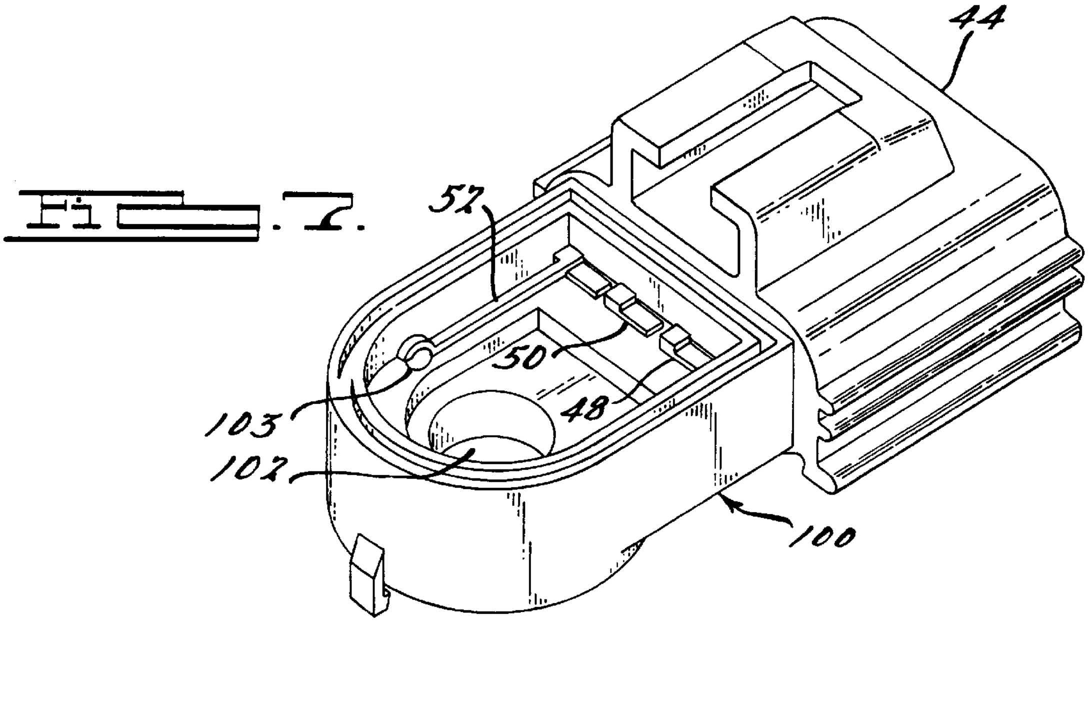

FUEL SENSOR

BACKGROUND OF THE INVENTION

1. Field of the Invention

The present invention relates to fuel delivery systems for motor vehicles.

2. Description of the Related Art

In the control of a fuel system of a motor vehicle, knowledge of the pressure and temperature of the fuel being provided to the fuel injectors for supply to the engine can be advantageous. One such instance when that data can be advantageous is in "electronic returnless" fuel systems. In an electronic returnless fuel system, the system's fuel pump is typically controlled in order to effect a predetermined fuel pressure in the fuel rail of the engine or across the engine's fuel injectors. Data about fuel temperature and fuel pressure would conventionally come from sensors dedicated for those purposes.

In the continuing effort to reduce vehicle costs, it is advantageous to find increasingly cost-efficient means to perform the various functions on a vehicle. Thus, a design which provides effective fuel pressure and fuel temperature sensing at reduced cost will provide advantages reflected in reduced vehicle costs.

In addition to cost efficiency, another challenge in vehicle design is packaging the various components of the vehicle. Particularly in the engine compartment, "real estate" is becoming increasingly more dear. Thus, designs which facilitate efficient packaging will prove advantageous.

SUMMARY OF THE INVENTION

The present invention provides a fuel sensor comprising a first passage having an inlet and an outlet, one of the inlet and outlet adapted for connection to a fuel line and the other of the inlet and outlet adapted for connection to a fuel delivery manifold. The fuel sensor also includes a transducer coupled in a sensing relationship to the first passage.

The present invention also provides a second fuel sensor. The second fuel sensor comprises a first member defining a first passage, the first passage having an inlet and an outlet, one of the inlet and outlet adapted for connection to a fuel line and the other of the inlet and outlet adapted for connection to a fuel delivery manifold. The sensor further includes a second member comprising a plastic body, electrical leads held by the plastic body and a pressure transducer mounted within the body and electrically coupled to the leads. Additionally, the sensor comprises a housing comprising a cavity adapted for insertion of an external electrical connector and terminals held by the housing and extending into said cavity. In the second fuel sensor, the housing is coupled to the first member, and the second member is coupled to the housing with the pressure transducer in fluid communication with the first passage and with the leads electrically coupled to the terminals.

In a variation on the first and second fuel sensors provided by the present invention, a second transducer can be included.

The present invention provides packaging advantages over alternative designs. The present invention further provides the potential for cost savings through integration of multiple transducers in a single sensor. For at least these reasons, the present invention provides advantages over the prior art.

BRIEF DESCRIPTION OF THE DRAWINGS

FIG. 6 is a fourth partial assembly drawing of fuel sensor 22.

FIG. 6A is a cross-sectional view taken along line 6A—6A of FIG. 6.

FIG. 7 is a fifth partial assembly drawing of fuel sensor 22.

DETAILED DESCRIPTION OF THE PREFERRED EMBODIMENT

Figure 1:
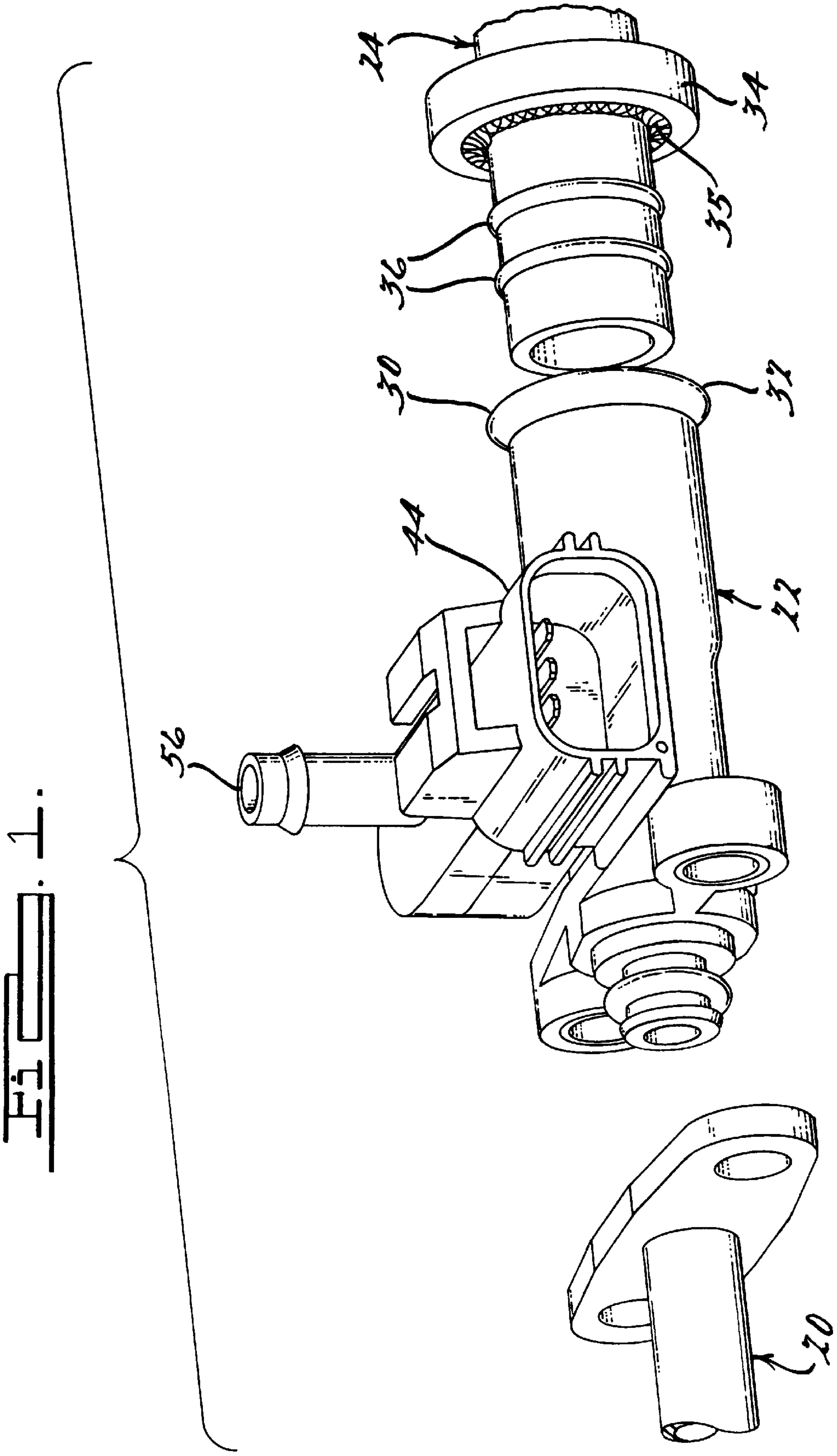
FIG. 1 shows a portion of a fuel system according to one embodiment of the present invention.

Referring first to FIG. 1, a system according to one embodiment of the present invention is illustrated. The system includes a fuel delivery manifold (often known as a fuel rail) 20. Fuel delivery manifold 20 includes one or more fuel injectors (not shown) which inject fuel into the various cylinders of the engine. The system also includes a fuel sensor 22 and a fuel line 24. As will be described in detail, fuel sensor 22 performs the functions of capping the end of fuel delivery manifold 20 and sensing one or more parameters of the fuel flowing into fuel delivery manifold 20. Examples of parameters which can be measured are fuel temperature and fuel pressure.

Figure 2:
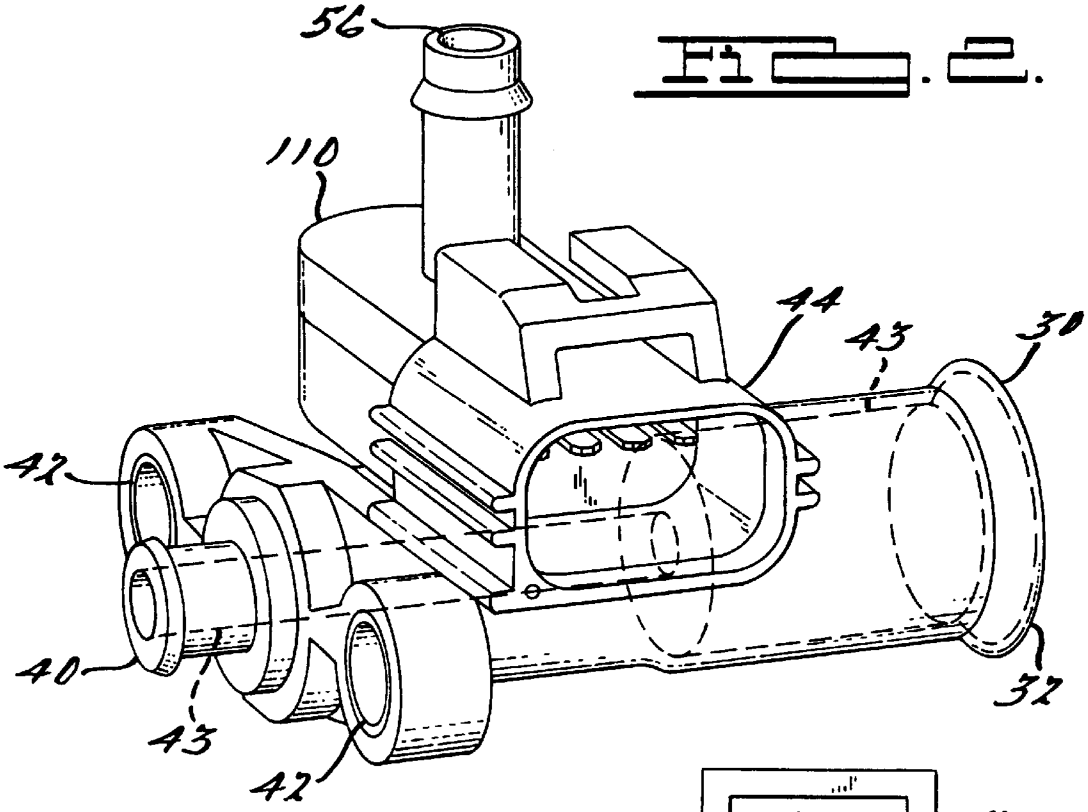
FIG. 2 shows the fuel sensor 22 of FIG. 1.
Figure 2A:
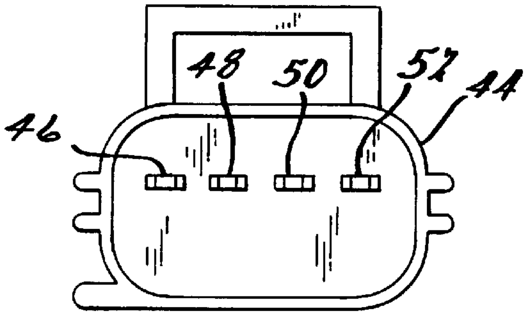
FIG. 2A is a view into connector 44 of fuel sensor 22 of FIG. 1.

Refer now additionally to FIGS. 2 and 2A, where fuel sensor 22 is shown in greater detail. Fuel sensor 22 includes an inlet 30. Inlet 30 in turn has an integral flared end 32. This flared end 32 is adapted for connection of fuel line 24. Fuel line 24 carries within its connector 34 a garter spring 35. When fuel line 24 is pressed into inlet 30, garter spring 35 captures flared end 32, holding fuel line 24 in place. O-rings 36 ensure a seal at the connection. Such a connection method is in wide use on Ford Motor Company vehicles. If more detail is desired about this connection method, the reader is referred to pages 03-04A-1 to 03-04A-21 of the July, 1993 edition of the 1994 Ford Taurus Service Manual. Those pages are hereby incorporated by reference.

Fuel sensor 22 also has an outlet 40 and bolt holes 42. Via outlet 40 and bolt holes 42, fuel sensor 22 is adapted for coupling to fuel delivery manifold 20. Inlet 30 and outlet 40 are at opposite ends of a through passage 43 by which fuel from fuel line 24 is provided to fuel delivery manifold 20.

Fuel sensor 22 further has an electrical connector 44 having terminals 46, 48, 50 and 52. Electrical connector 44 is adapted for connection to an external electrical connector.

Fuel sensor 22 also has a vacuum port (or nipple) 56. Vacuum port 56 can be included if fuel sensor 22 is adapted to measure fuel pressure and if it is desired for the fuel pressure to be measured relative to the intake manifold pressure of the engine.

Figure 3:
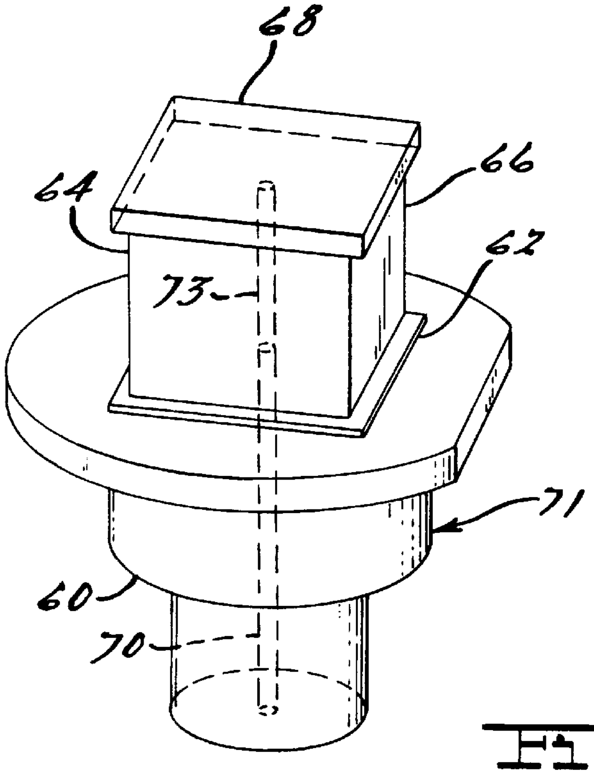
FIG. 3 is a partial assembly drawing of fuel sensor 22.

The construction of fuel sensor 22 will now be described, with initial reference to FIG. 3. Fuel sensor 22 includes a ceramic header 60. Disposed on ceramic header 60 is an adhesive/sealant 62. Adhesive 62 can be selected from a wide variety of materials including solder, glass seal material and RTV. Disposed on adhesive 62 is pressure transducer 64. Pressure transducer 64 includes a glass substrate (also known as a pedestal or constraint layer) 66 and a silicon micromachined pressure transducer element 68. Glass substrate 66 and pressure transducer element 68 are anodically bonded together. Pressure transducer 64 is commercially available as a subassembly from the Robert Bosch Corporation. Ceramic header 60 includes a passage 70, and glass substrate 66 includes a passage 73. Passages 70 and 73 are aligned. The specific processing for adhesive 62 depends upon the adhesive used. If adhesive 62 is solder, a reflow furnace can be used. If adhesive 62 is a glass seal material, a high-temperature oven can be used in a firing operation. If adhesive 62 is RTV, an appropriate curing process can be employed. Adhesive 62 is applied so as to not block passages 70 and 73. The assembly shown in FIG. 3 will hereinafter be referred to as "Level 1 Assembly" 71.

Figure 4:
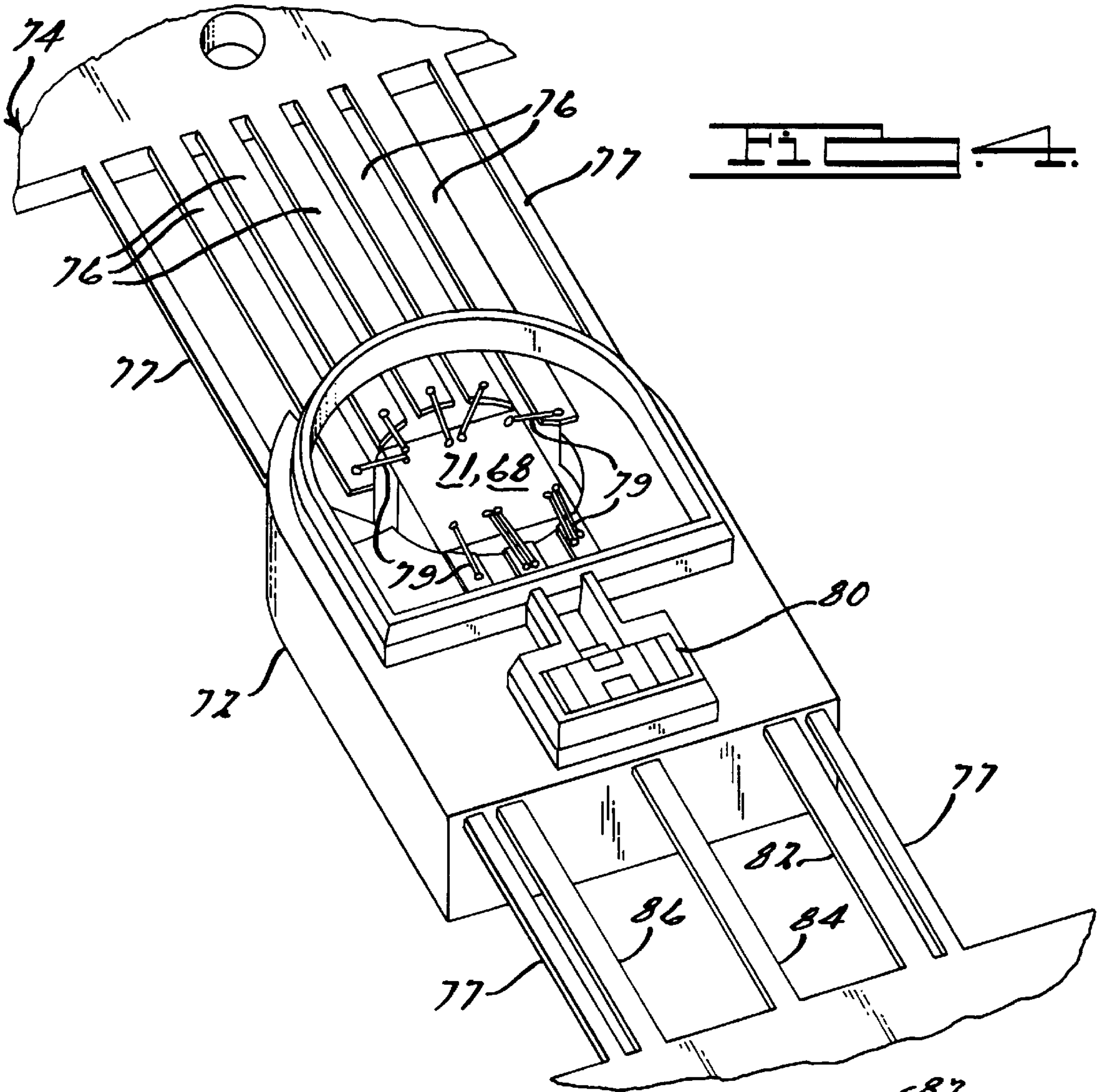
FIG. 4 is another partial assembly drawing of fuel sensor 22, which integrates the partial assembly of FIG. 3.

Refer now additionally to FIG. 4. Fuel sensor 22 further includes a body 72, preferably formed of injection-molded plastic. Leads from a lead frame 74 (such as leads 76, 77, 82, 84 and 86) are insert molded into a body 72. For efficiencies in processing, a number of bodies 72 are sequentially injected molded onto a single lead frame 74.

Once the bodies 72 are so molded onto lead frame 74, a Level 1 Assembly 71 is placed into each body 72. Wires 79 are then wirebonded between pressure transducer element 68 and appropriate leads of lead frame 74. A chip capacitor 80 array (including two chip capacitors) is also provided for electromagnetic interference (EMI) protection as appropriate. Potting is then provided for environmental sealing of the cavities containing Level 1 Assembly 71 and chip capacitor array 80.

Figure 5:
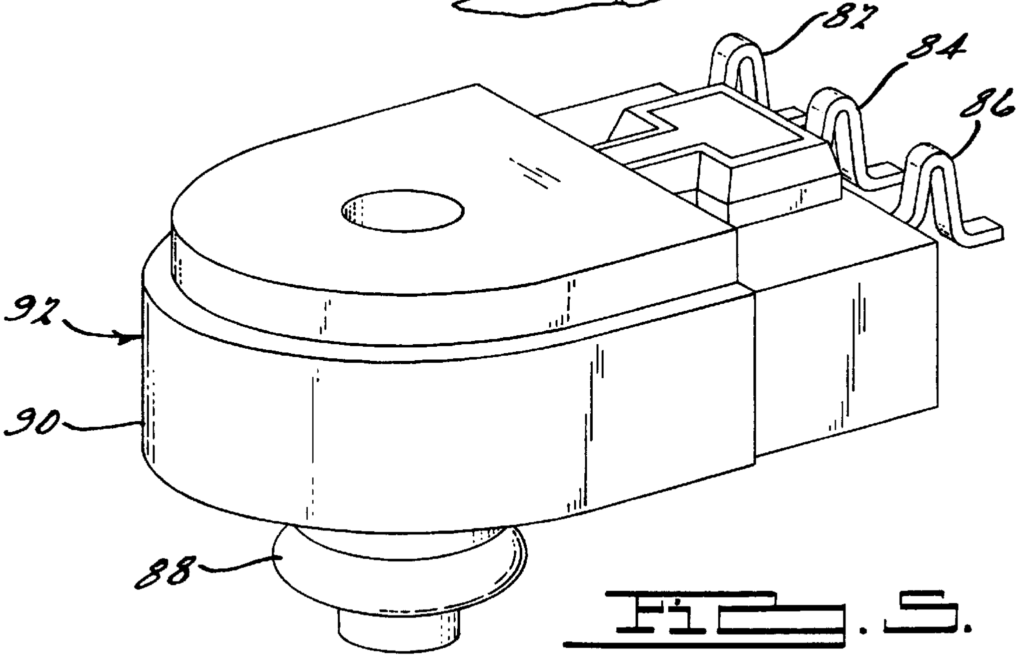
FIG. 5 is a third partial assembly drawing of fuel sensor 22, which integrates the partial assembly of FIG. 4.

Refer now additionally to FIG. 5. Each lead is cut free from lead frame 74. Leads 82, 84 and 86 are formed to facilitate further connection, as will be described shortly. Leads 82, 84 and 86 are the ground, power and signal connections, respectively, for the pressure sensing function of fuel sensor 22. Leads 76 serve to provide internal connections to pressure transducer element 68 for testing and calibration of pressure transducer element 68 during assembly of fuel sensor 22. Such calibration includes electrically "burning" (opening) thyristors within pressure transducer element 68 such that pressure transducer element 68 has the intended pressure versus output voltage transfer function. Leads 77 serve purely to hold body 72 in place for processing and have no electrical connections within body 72. An O-ring 88 is applied for appropriate sealing, as will be described. Further, a metal "can" 90 is placed so as to substantially surround pressure transducer element 68. Metal "can" 90 provides EMI shielding for pressure transducer element 68. The subassembly shown in FIG. 5 is now complete and will be referred to as "Level 2 Assembly" 92.

Refer now to FIGS. 2, 6 and 6A. Fuel sensor 22 includes a fuel port 94. Fuel port 94 comprises fuel inlet 30 and fuel outlet 40. Fuel port 94 also includes orifice 95, which is in fluid communication with fuel passage 43 via passages 99. Fuel port 94 is preferably an injection-molded plastic component.

In addition to fuel pressure sensing, fuel sensor 22 can also include means for sensing fuel temperature. To provide this capability, a thermistor 97 is insert-molded into fuel port 94. Thermistor 97 has leads 96 and 98. Thermistor 97 is preferably located so it is very close to fuel passage 43 but not actually in fuel passage 43. Thus, thermistor 97 is in close thermal communication with the fuel in fuel passage 43 (i.e., in "sensing" relationship with the fuel), but thermistor 97 is not in physical contact with the fuel.

Refer now additionally to FIG. 7. Fuel sensor 22 includes a housing 100. Housing 100 is preferably formed of injection molded plastic. Connector 44 is formed in housing 100. Insert molded into housing 100 are terminals 46, 48, 50 and 52 of connector 44. Housing 100 further includes a hole 102, designed to interface with orifice 95. Housing 100 also includes a hole 103, designed to accommodate lead 96 of thermistor 97. A corresponding hole (not visible in FIG. 7) is designed to accommodate lead 98 of thermistor 97.

Figure 8:
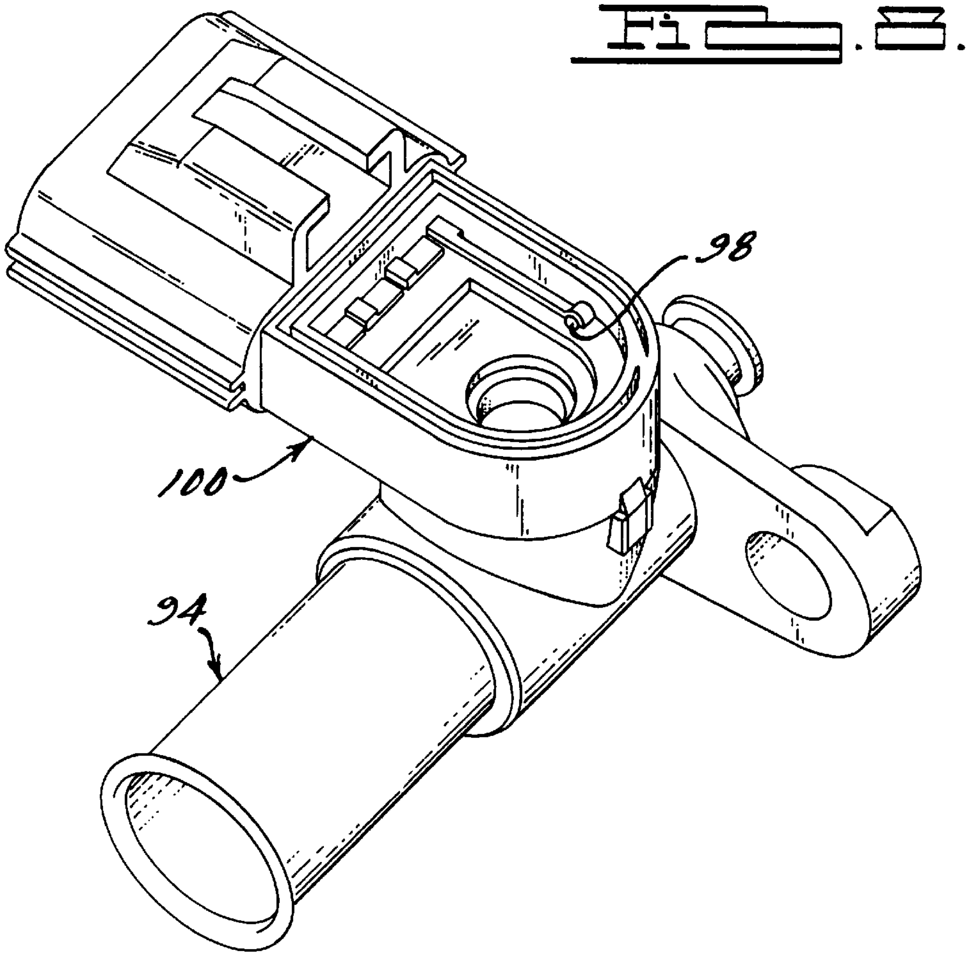
FIG. 8 is a sixth partial assembly drawing of fuel sensor 22, which integrates the partial assemblies of FIGS. 6 and 7.

Refer now additionally to FIG. 8. Housing 100 is attached to fuel port 94, such as by snap-fit (as shown in FIG. 8) and/or adhesive. Thermistor leads 96 and 98 protrude through holes in housing 100 (although only thermistor lead 98 is visible in the view of FIG. 8). As housing 100 and fuel port 94 are attached, orifice 95 of fuel port 94 and hole 102 of housing 100 are aligned and communicate with fuel passage 43.

Figure 9:
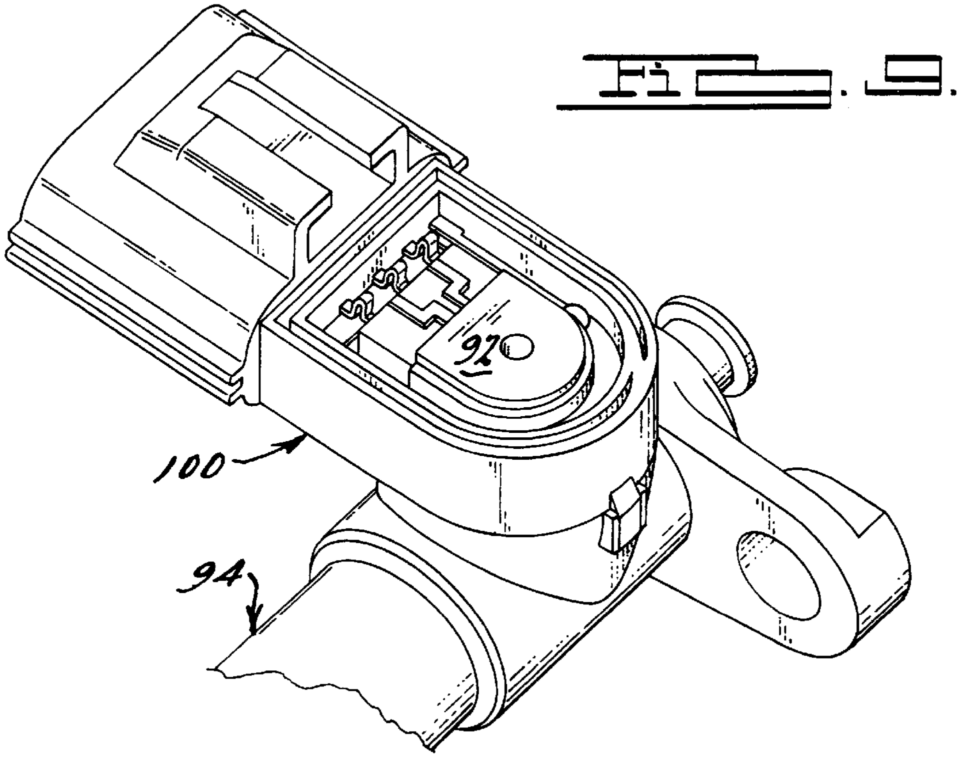
FIG. 9 is a seventh partial assembly drawing of fuel sensor 22, which integrates the partial assemblies of FIGS. 6, 7 and 8.

Refer now additionally to FIG. 9. Level 2 Assembly 92 is inserted into housing 100. O-ring 88 seals orifice 95 of fuel port 94 to prevent fuel from escaping. However, passages 70 and 73 (FIG. 3) allow pressure transducer element 68 to be in fluid communication with the fuel in fuel passage 43. (Thus, pressure transducer element 68 is in a "sensing" relationship to fuel in fuel passage 43.) Leads 84 and 86 of Level 2 Assembly 92 and lead 98 of thermistor 97 are then electrically coupled, such as by laser welding, to terminals 46, 48 and 50 of housing 100. Lead 82 of Level 2 Assembly 92 and lead 96 of thermistor 97 are both connected to terminal 52 of housing 100, again by means such as laser welding. The four terminals of housing 100 are thus assigned as follows:

| Terminal | Function |
|---|---|
| 46 | Thermistor 97 |
| 48 | Pressure Transducer 84 Power |
| 50 | Pressure Transducer 84 Signal |
| 52 | Shared Signal Ground for Thermistor 97 and Pressure Transducer 84 |

Refer once again to FIG. 2. Cap 110, which includes vacuum port 56, is then affixed to housing 100 by snap-fit, adhesive or other means. If vacuum port 56 is subsequently connected to an intake manifold vacuum reference of the motor vehicle's engine, fuel sensor 22 will measure the difference in pressure between the intake manifold absolute pressure and the absolute pressure of the fuel in fuel passage 43. The differential pressure across the fuel injectors of the engine, known as "injection pressure," will thus be sensed by fuel sensor 22.

By integrating fuel pressure sensing with fuel temperature sensing, fuel sensor 22 provides cost advantages over systems in which those functions are performed by separate sensors. Further, by integrating one or both of those functions within a fuel rail end cap, the overall packaging within the vehicle's engine compartment can be improved. Without such integration, the fuel pressure and/or fuel temperature sensors would be mounted elsewhere on the fuel rail, in locations which would likely increase the overall packaging "envelope" of the engine. With such integration, the fuel pressure and/or fuel temperature sensing function is included in such a manner that eliminates this adverse packaging impact. A further packaging advantage is that fuel sensor 22 can easily be attached to fuel rail 20 (FIG. 1) with vacuum port 56 pointed downward. This is highly desirable to prevent moisture or intake manifold contamination from entering fuel sensor 22 through vacuum port 56.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A fuel sensor comprising:

a first passage having an inlet and an outlet, one of said inlet and said outlet adapted for connection to a fuel line and the other of said inlet and said outlet adapted for direct, sealed connection to a fuel delivery manifold; and a pressure transducer coupled in a sensing relationship to said first passage;

wherein said transducer is sealingly coupled to a ceramic element, said ceramic element containing a second fluid passage through which said transducer is in fluid communication with said first passage.

2. A fuel sensor as recited in claim 1, wherein said sensor further comprises a port in fluid communication with said transducer but isolated from fluid communication with said first passage.

3. A fuel sensor as recited in claim 1, further comprising a second transducer coupled in a sensing relationship to said first passage.

4. A fuel sensor as recited in claim 3, wherein said second transducer is a temperature-sensing transducer.

5. A fuel sensor as recited in claim 4, wherein:

said first passage is defined by a plastic member; and said temperature-sensing transducer is embedded into said plastic member in thermal communication with said first passage.

6. A fuel sensor as recited in claim 5, wherein said temperature-sensing transducer is isolated from fluid communication with said first passage.

7. A fuel sensor as recited in claim 6, wherein said temperature-sensing transducer is a thermistor.

8. A fuel sensor comprising:

a first member having a first passage, said first passage having an inlet and an outlet, one of said inlet and said outlet adapted for connection to a fuel line and the other of said inlet and said outlet adapted for direct, sealed connection to a fuel delivery manifold;

a second member comprising a plastic body, electrical leads held by said plastic body and a pressure transducer mounted within said body and electrically coupled to said leads; and a housing comprising a cavity adapted for insertion of an external electrical connector and terminals held by said housing and extending into said cavity;

wherein said housing is coupled to said first member;

wherein said second member is coupled to said housing with said pressure transducer in fluid communication with said first passage and with said leads electrically coupled to said terminals; and wherein within said second member, said pressure transducer is sealingly coupled to a ceramic element, said ceramic element having a second passage through which said pressure transducer is in fluid communication with said first passage.

9. A fuel sensor as recited in claim 8, wherein said housing is snap-fit to said first member.

10. A fuel sensor as recited in claim 8, wherein said leads are molded into said body and said terminals are molded into said housing.

11. A fuel sensor as recited in claim 8, further comprising a temperature-sensing transducer embedded in said first member in thermal communication with said first passage.

12. A fuel sensor as recited in claim 11, wherein said temperature-sensing transducer comprises at least one lead electrically coupled to a said terminal.

13. A fuel sensor as recited in claim 8, further comprising a port in fluid communication with said pressure transducer and isolated from fluid communication with said first passage.

* * * * *